US011205343B2

(12) United States Patent
Bush et al.

(10) Patent No.: US 11,205,343 B2
(45) Date of Patent: Dec. 21, 2021

(54) METHODS AND SYSTEMS FOR INTERPRETATING TRAFFIC SIGNALS AND NEGOTIATING SIGNALIZED INTERSECTIONS

(71) Applicant: GM GLOBAL TECHNOLOGY OPERATIONS LLC, Detroit, MI (US)

(72) Inventors: Lawrence A. Bush, Shelby Township, MI (US); Michael A. Losh, Rochester Hills, MI (US); Aravindhan Mani, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 16/280,152

(22) Filed: Feb. 20, 2019

(65) Prior Publication Data
US 2020/0265709 A1     Aug. 20, 2020

(51) Int. Cl.
*G06K 9/00* (2006.01)
*G08G 1/01* (2006.01)

(52) U.S. Cl.
CPC ....... *G08G 1/0129* (2013.01); *G06K 9/00798* (2013.01); *G06K 9/00825* (2013.01); *G08G 1/0133* (2013.01)

(58) Field of Classification Search
CPC ............... G08G 1/0129; G08G 1/0133; G06K 9/00798; G06K 9/00825
USPC ........................................................ 701/117
See application file for complete search history.

(56) References Cited

U.S. PATENT DOCUMENTS

| | | | |
|---|---|---|---|
| 2018/0114077 A1* | 4/2018 | Ferguson | G08G 1/09626 |
| 2018/0181884 A1* | 6/2018 | Rolle | G06N 7/08 |
| 2018/0300567 A1* | 10/2018 | Qin | G06K 9/00825 |

OTHER PUBLICATIONS

"Andrés E. Gómez; Francisco A. R. Alencar; Paulo V. Prado; Fernando S. Osório; Denis F. Wolf, Traffic Lights Detection and State Estimation Using Hidden Markov Models, Jun. 8-11, 2014, IEEE, 2014 IEEE Intelligent Vehicles Symposium (IV), p. 750-755" (Year: 2014).*
"Adele Diederich and Jerome R. Busemeyer, Simple matrix methods for analyzing diffusion models of choice probability, choice response time, and simple response time, Jun. 2003, Science Direct, Journal of Mathematical Psychology vol. 47 Issue 3, p. 304-322" (Year: 2003).*

(Continued)

*Primary Examiner* — James M McPherson
(74) *Attorney, Agent, or Firm* — Lorenz & Kopf LLP

(57) ABSTRACT

Systems and methods are provided for interpreting traffic information by a vehicle. In one embodiment, a method includes: receiving, by a processor, sensor data from one or more sensing devices of the vehicle, where the sensor data depicts a traffic device in an environment of the vehicle; receiving, by the processor, map data associated with the environment of the vehicle, where the map data includes traffic devices; matching, by the processor, the traffic device of the sensor data with a traffic device of the map data; determining, by the processor, a probability distribution of a traffic signal associated with the matched traffic devices based on a Hidden Markov model (HMM); and planning, by the processor, control of the vehicle based on the probability distribution.

14 Claims, 7 Drawing Sheets

(56) References Cited

OTHER PUBLICATIONS

"Brian D.O. Anderson, From Wiener to Hidden Markov Models, Jun. 1999, IEEE, IEEE Control Systems Magazine, vol. 19 Issue 3, p. 41-51" (Year: 1999).*

Anerson, "From Wiener to Hidden Markov," IEEE Control Systems Magazine, Jun. 30, 1999.

Diederich et al., "Simple matrix methods for analyzing diffusion models of choice probability, choice response time, and simple response time," Journal of Mathematical Psychology, Jan. 8, 2003.

Gomez et al., "Traffic lights detection and state estimation using Hidden Markov Models." IEEE Intelligent Vehicles Symposium, Jun. 8-11, 2014.

* cited by examiner

METHODS AND SYSTEMS FOR INTERPRETATING TRAFFIC SIGNALS AND NEGOTIATING SIGNALIZED INTERSECTIONS

INTRODUCTION

The present disclosure generally relates to vehicles, and more particularly relates to the detection and interpretation of traffic signals that regulate the traffic flow of vehicles.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles detect traffic devices using one or more of the sensing devices. The autonomous vehicles also determine a traffic signal that is emitted from the traffic device In order to plan the route for the vehicle, the autonomous vehicle must know which lane the detected traffic device relates to and must know the current traffic signal or state (e.g., red light, green light, yellow light, green arrow, etc.) of the traffic device. In some instances the determination of the related lane and/or the current traffic signal is inaccurate.

Accordingly, it is desirable to provide improved systems and methods for detecting and interpreting traffic signals of a traffic device. It is further desirable to provide improved systems and method for determining a lane associated with a determined traffic signal. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for interpreting traffic information by a vehicle. In one embodiment, a method includes: receiving, by a processor, sensor data from one or more sensing devices of the vehicle, where the sensor data depicts a traffic device in an environment of the vehicle; receiving, by the processor, map data associated with the environment of the vehicle, where the map data includes traffic devices; matching, by the processor, the traffic device of the sensor data with a traffic device of the map data; determining, by the processor, a probability distribution of a traffic signal associated with the matched traffic devices based on a Hidden Markov model (HMM); and planning, by the processor, control of the vehicle based on the probability distribution.

In various embodiments, the method includes: determining a probability distribution of another traffic signal associated with the matched traffic devices based on an inference model.

In various embodiments, the Hidden Markov model includes a diffusion model.

In various embodiments, the diffusion model applies diffusion values to a signal state matrix based on a time. In various embodiments, the diffusion model applies the diffusion values to the signal state matrix further based on a state transition model.

In various embodiments, the Hidden Markov model includes a measurement model. In various embodiments, the measurement model applies measured values to a signal state matrix based on a detected signal state of the traffic signal.

In various embodiments, the method includes: determining intersection information associated with the matched traffic devices based on the map data, and wherein the probability distribution is based on the intersection information.

In various embodiments, the intersection information includes at least one of lane segments and lane to lane connections associated with the matched traffic devices.

In various embodiments, the method includes: determining whether the traffic signal is detected from the sensor data, wherein when the traffic signal is detected, the determining the probability distribution is based on a measurement model, and wherein when the traffic signal is not detected, the determining the probability distribution is based on a diffusion model.

In another embodiment, a system includes: a map datastore that stores map data associated with an environment of the vehicle, where the map data includes traffic devices; a sensing device that generates sensor data, where the sensor data depicts a traffic device in the environment of the vehicle; a control module configured to, by a processor, match the traffic device of the sensor data with a traffic device of the map data, determine a probability distribution of a traffic signal associated with the matched traffic devices based on a Hidden Markov model (HMM), and plan control of the vehicle based on the probability distribution.

In various embodiments, the control module is further configured to determine a probability distribution of another traffic signal associated with the matched traffic devices based on an inference model.

In various embodiments, the Hidden Markov model includes a diffusion model.

In various embodiments, the diffusion model applies diffusion values to a signal state matrix based on a time.

In various embodiments, the diffusion model applies the diffusion values to the signal state matrix further based on a state transition model.

In various embodiments, the Hidden Markov model includes a measurement model. In various embodiments, the measurement model applies measured values to a signal state matrix based on a detected signal state of the traffic signal. In various embodiments, the control module is further configured to determine intersection information associated with the matched traffic devices based on the map data, and wherein the probability distribution is based on the intersection information.

In various embodiments, the intersection information includes at least one of lane segments and lane to lane connections associated with the matched traffic devices.

In various embodiments, the control module is further configured to determine whether the traffic signal is detected from the sensor data, wherein when the traffic signal is detected, the control module determines the probability distribution is based on a measurement model, and wherein when the traffic signal is not detected, the control module determines the probability distribution is based on a diffusion model.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
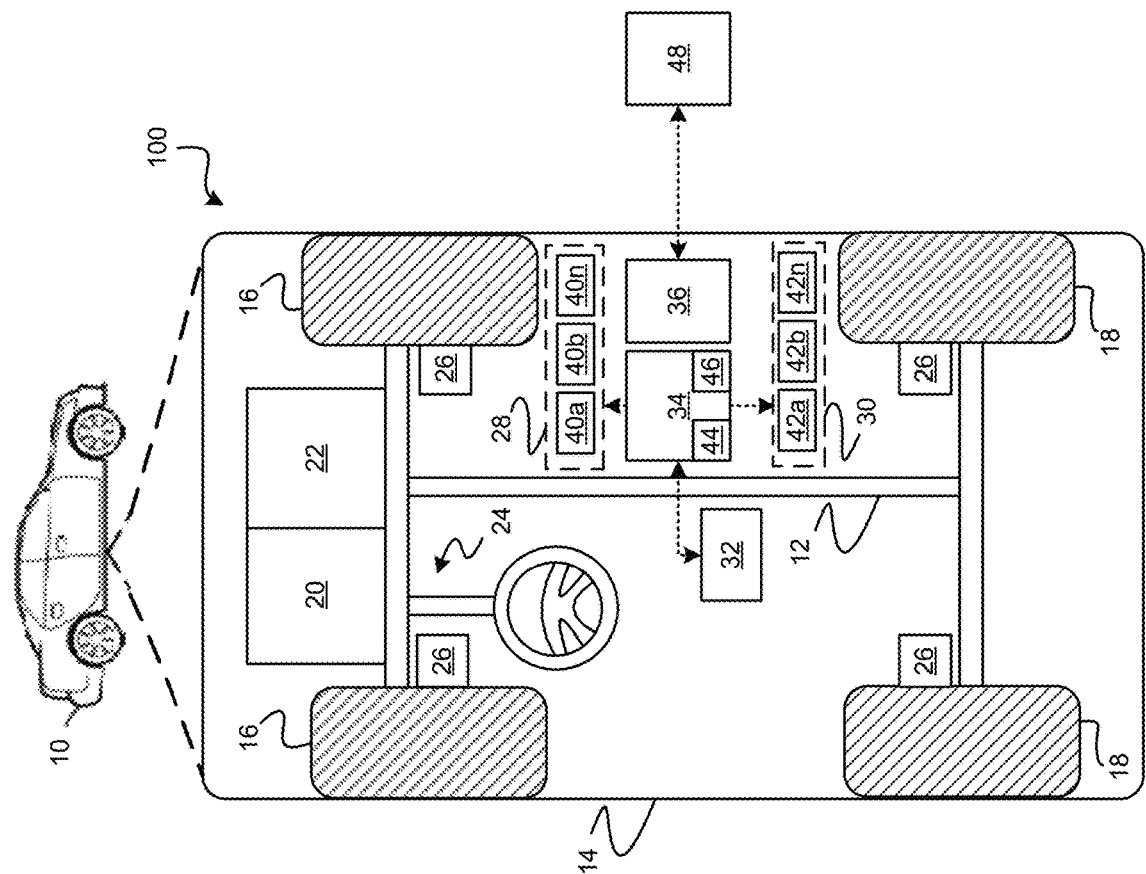
FIG. 1 is a functional block diagram illustrating an autonomous vehicle having an interpretation system, in accordance with various embodiments.

With reference to FIG. 1, an interpretation system shown generally at 100 is associated with a vehicle 10 in accordance with various embodiments. In general, the interpretation system 100 processes data provided by one or more sensing devices disposed about the vehicle 10 (as will be discussed in more detail below) to detect traffic devices in the environment of the vehicle 10. The interpretation system 100 then interprets a current traffic signal (e.g., red light, green light, yellow light, green arrow, red flashing, yellow flashing, etc.) of the detected traffic device In various embodiments, the interpretation system 100 makes use of a Hidden Markov Model (HMM) to generate a probability distribution of defined states of a traffic signal. In various embodiments, the probability distribution can include any number of states. For exemplary purposes of discussion, the defined states, can include but are not limited to, a red state, a yellow state, a green state, a yellow flashing state, a red flashing state, a green flashing state, a green arrow state, etc. In various embodiments, the autonomous vehicle 10 uses the probability distribution to make decisions about navigating the vehicle 10 through the environment.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the interpretation system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, or simply robots, etc., that are regulated by traffic devices can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can be any level of automation or have no automation at all (e.g., when the system 100 simply presents the probability distribution to a user for decision making).

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the interpretation system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
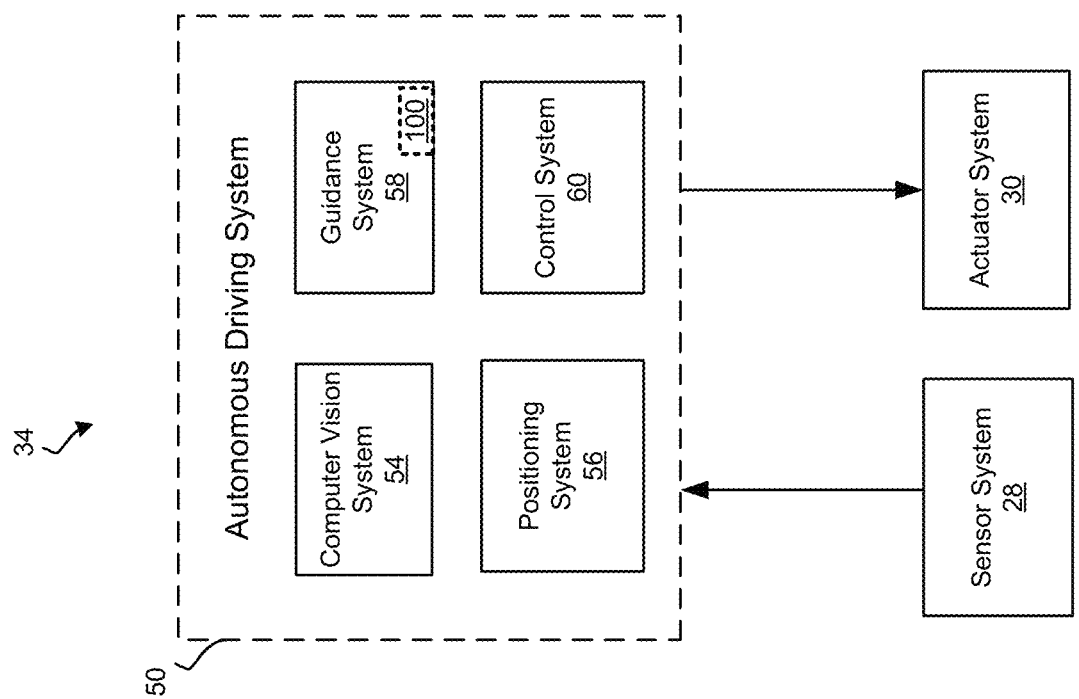
FIG. 2 is a dataflow diagram illustrating an autonomous driving system that includes the interpretation system, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps are built from the sensor data of the vehicle 10. In various embodiments, the maps are received from a remote system and/or other vehicles. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the interpretation system 100 and, when executed by the processor 44, integrates real time information from the sensing devices 28 and information from the data storage device and outputs a probability distribution of traffic signal states based thereon. The integrated information is processed using HMM prediction and smoothing and post HMM inference to produce the probability distributions over traffic signal states for a direct intersection connection and other intersection connections. The instructions of the controller 34 further make use of these probability distributions in making decisions for and planning upcoming vehicle maneuvers used to navigate the vehicle 10 through the environment.

As can be appreciated, the subject matter disclosed herein provides certain enhanced features and functionality to what may be considered as a standard or baseline non-autonomous vehicle or autonomous vehicle 10, and/or an autonomous vehicle based remote transportation system (not shown) that coordinates the autonomous vehicle 10. To this end, a non-autonomous vehicle, an autonomous vehicle, and an autonomous vehicle based remote transportation system can be modified, enhanced, or otherwise supplemented to provide the additional features described in more detail below. For exemplary purposes the examples below will be discussed in the context of an autonomous vehicle.

In accordance with various embodiments, the controller 34 implements an autonomous driving system (ADS) 50 as shown in FIG. 2. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 56, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from multiple sensors, including but not limited to cameras, lidars, radars, and/or any number of other types of sensors.

The positioning system 56 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, the interpretation system 100 of FIG. 1 may be included within the ADS 50, for example, as part of the guidance system 58. For example, the interpretation system 100 receives data from the computer vision system 54 and the positioning system 56 and provides probability distributions that are used in decision making to ultimately determine the path of the vehicle 10.

Figure 3:
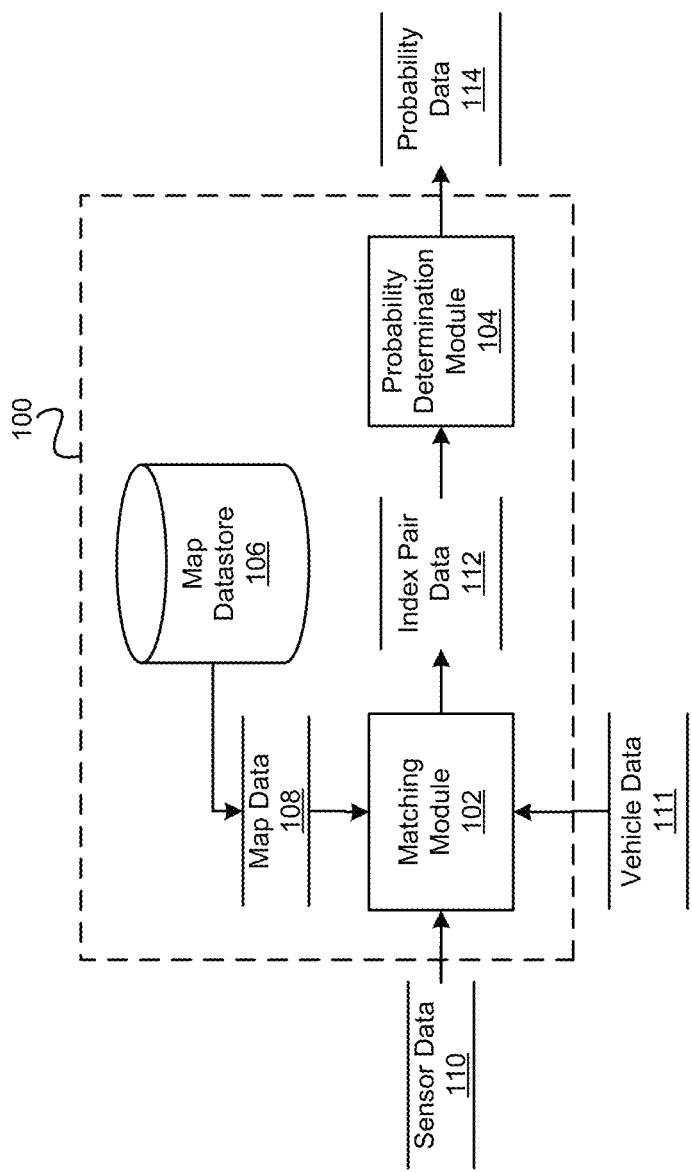
FIG. 3 is a dataflow diagram illustrating an interpretation, in accordance with various embodiments.

As shown in more detail with regard to FIG. 3 and with continued reference to FIGS. 1 and 2, the interpretation system 100 includes a matching module 102, a probability determination module 104, and a map datastore 106.

The map datastore 106 stores maps of the navigable environment. The maps include details such as lane boundaries, lane segments, lane-to-lane connections, and traffic devices. The map datastore 106 makes available map data 108 for further processing.

Figure 4:
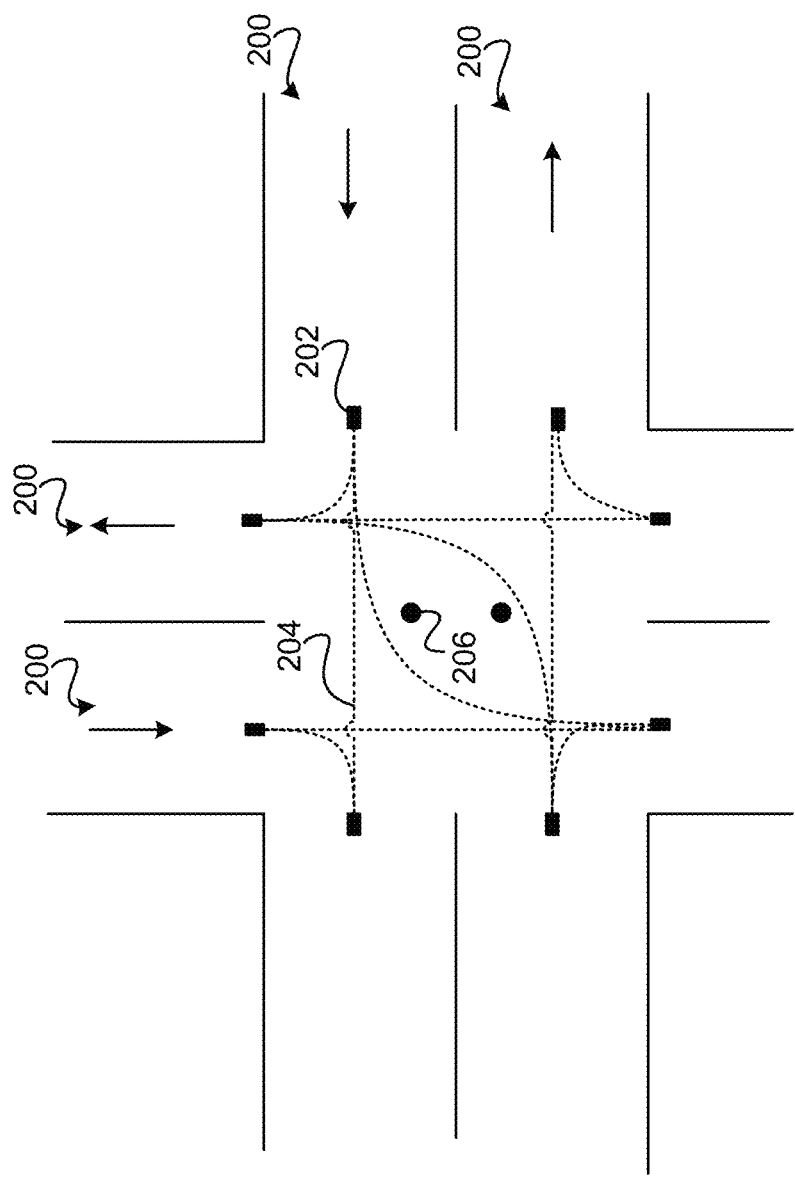
FIG. 4 is an illustration of an exemplary intersection and detected traffic devices, in accordance with various embodiments.

The matching module 102 receives as input map data 108 associated with the upcoming path, sensor data 110 generated by the sensing devices 28 of the vehicle 10, and vehicle data 111 indicating a vehicle location and/or orientation. As shown in FIG. 4, exemplary map data 108 includes, lanes 200, lane segments 202, lane-to-lane connections 204, and traffic devices 206 associated with, for example, an intersection 208 or other road feature. The sensor data 110 includes data identifying a sensed traffic device and/or a sensed traffic signal of the sensed traffic device. Such data can include, but is not limited to, an x, y, z position, an orientation, a timestamp, a signal state, a signal width, a device type, etc.

The matching module 102 matches the sensed traffic device and/or the sensed traffic signal of the sensor data 110 to a traffic device defined in the map data 108. The matching module 102 then matches the sensed traffic device and/or the sensed traffic signal to lane segments and/or lane-to-lane connections defined in the map data 108. For example, the matching module 102 performs the matching based on a location and/or lane position of the vehicle 10, a projected location of the sensed traffic device and/or the sensed traffic signal, and a location of the traffic device in the map. The matching module 102 then filters out any unwanted detections. For example, the matching module 102 filters based on a detection distance from the intersection (i.e., range), detection position consistency (i.e., fluctuations measured), and/or other parameters that may relate to accuracy. The matching module 102 produces an index pair 112 that associates the matched traffic device of the map with the sensed traffic information for further processing.

The probability determination module 104 receives the index pair data 112 and determines probability distribution data 114 for a traffic signal identified by the match. In various embodiments, the probability distribution data 114 includes a probability distribution for the sensed traffic signal and a probability distribution for other traffic signals related to the traffic device (e.g., traffic signals of an opposing and/or adjacent side of the traffic device).

In various embodiments, the determination of the probability distribution is based on whether or not the traffic signal was detected from the traffic device. For example, in some cases the traffic device may be detected by the sensing devices 28 but an accurate traffic signal may not yet be detected. When the sensor data 110 from the index pair does not indicate that a traffic signal is detected, the probability determination module 104 determines the probability distribution based on a diffusion model. The diffusion model, for example, updates a signal state matrix with probability values based on a last detected traffic signal, a time since the last detected traffic signal, and a state transition model associated with the type of traffic device.

Figure 5:
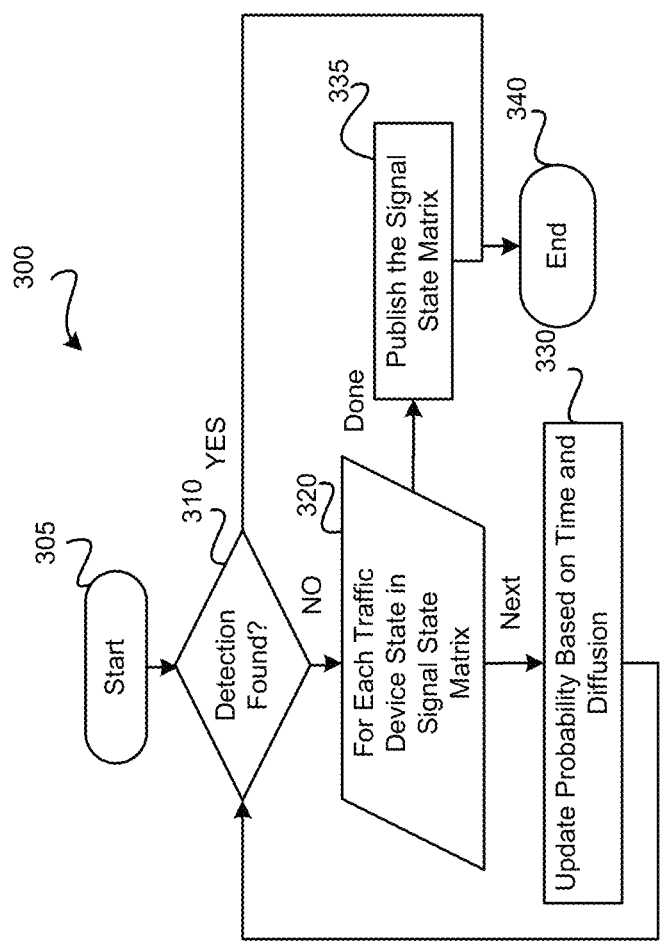
FIGS. 5, 6, and 7 are flowcharts illustrating interpretation methods that may be performed by the interpretation system, in accordance with various embodiments.

In one example, as shown in FIG. 5, an exemplary method 300 that includes the diffusion model begins at 305. It is determined whether a detection has been made at 310. If a detection has been made, the method may end at 340. If a detection has not been made at 310, the signal state for each state of the signal state matrix is updated at 320 and 330. In various embodiments, the signal state matrix can include any number of states corresponding to the potential traffic signals that can be emitted from the traffic device (e.g., a red state, a yellow state, a green state, etc.).

For example, for each signal state at 320, the probability value is set to an initial value based on the last detection and updated by a diffusion value (e.g., that reduces the probability) based on the time since the last detection and the state transition model associated with the traffic device at 330. Once all of the probability values have been updated at 320 the signal state matrix is published for use at 335 and the method may end at 340.

With reference back to FIG. 3, when the sensor data 110 of the index pair 112 indicates that a current traffic signal is detected, the probability determination module 104 determines the probability distribution based on a measurement model. The measurement model provides a weighting between the detected signal state verses other possible signal states and applies measurement data to the probability values of the signal state matrix.

Figure 6:

In one example, as shown in FIG. 6, an exemplary method 400 that includes the measurement model begins at 405. It is determined whether a detection has been made at 410. If a detection has not been made at 410, the method may end at 480. If a detection has been made at 410, it is determined whether the detection is valid at 420. For example, various parameters of the sensor data 110 and other vehicle data 111 may be evaluated to confirm that the detection is not a taillight, an emergency signals of an emergency vehicle, a street lamp, or other light emission in the environment. If the detection is not a valid traffic signal detection at 420, the method may end at 480. If, however, the detection is a valid traffic signal detection at 420, the method continues with confirming the match and applying measurement values at 430-470.

For example, any lane segments and/or lane to lane connections of the map data 108 that are determined to be related to the detected traffic signal are grouped at 430. In various embodiments, the determination may be made based on a closeness metric and a threshold.

At 440, the group of lane segments and/or lane to lane connection is evaluated to confirm the accuracy of the match between the sensed traffic signal and the traffic device. For example, during real-time use, the traffic signal state and emanating position (the traffic device position) are measured by an on vehicle sensing device. The distance from the measured traffic device position to the mapped traffic device position is used to evaluate device-lane match accuracy. In the case where no traffic device is mapped to the lane, the intersection center is considered. From this comparison (match accuracy), the group of lane segments (lane-to-lane connections) are evaluated.

At 450, the signal state is interpreted from the confirmed traffic signal and traffic signal device. A measurement matrix is then selected based on the signal state at 460 and applied to the signal state matrix at 470. Thereafter, the signal state matrix may be published for use at 475 and the method may end at 480.

With reference back to FIG. 3, once the probability distribution is determined for a detected traffic signal, a probability distribution can be inferred for other traffic signals (e.g., traffic signals on opposing or adjacent sides of the traffic device) associated with the traffic device based on an inference model.

Figure 7:
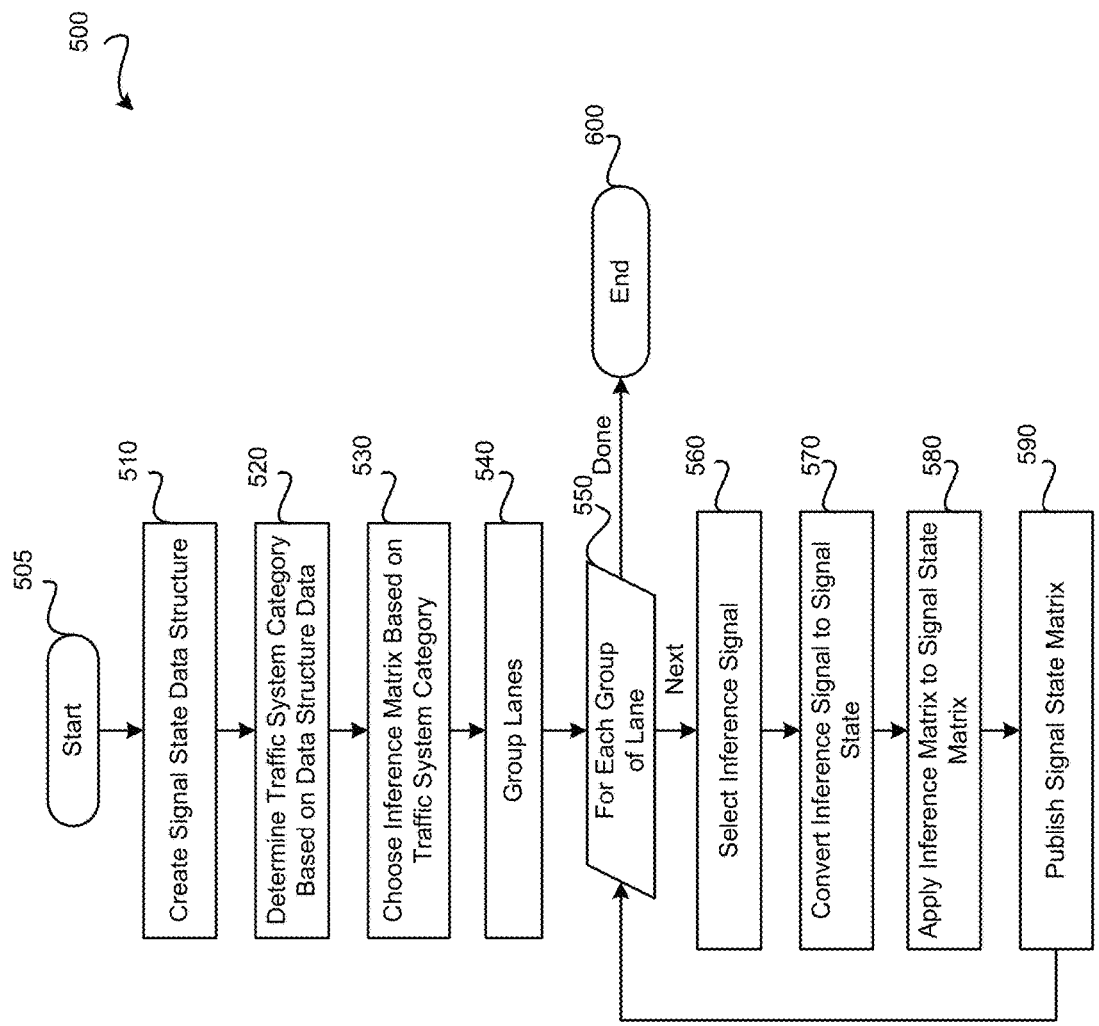

In one example, as shown in FIG. 7, an exemplary method 500 that includes the inference model begins at 505. A device data structure is initialized with the current signal state, an intersection identification, and lane identifiers of current and parallel lanes at 510. The data of the device data structure is then evaluated at 520 to categorize the traffic system (e.g., four lane intersection, two lane intersection, intersection having left turn lane, etc.) associated with the device. An inference matrix is then determined based on the determined category at 530. The lanes in the device data structure are then grouped based on whether they are opposing, crossing from the left, crossing from the right, etc. at 540. Each group is then processed at 550-600.

For example, for each group at 550, the inference signal is selected based on the sensed traffic signal and the group type at 560. The signal state is then set based on the inference signal at 570. The selected inference matrix is then applied to the signal state matrix based on the signal state at 580 and the signal state matrix is published at 590 for further processing. The method 500 continues until all of the groups have been processed at 550. Thereafter, the method may end at 600.

As can be appreciated, in light of the disclosure, the order of operation within the methods 300, 400, 500 is not limited to the sequential execution as illustrated in FIGS. 5-7 but may be performed in one or more varying orders as applicable and in accordance with the present disclosure. In various embodiments, the methods 300, 400, 500 can be scheduled to run based on one or more predetermined events, and/or can run continuously during operation of the vehicle 10. In various embodiments, one or more steps of the methods may be removed or added without altering the spirit of the method.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for interpreting traffic information by a vehicle, comprising:
   receiving, by a processor, sensor data from one or more sensing devices of the vehicle, where the sensor data depicts a traffic device in an environment of the vehicle;
   receiving, by the processor, map data associated with the environment of the vehicle, where the map data includes traffic devices;
   matching, by the processor, the traffic device of the sensor data with a traffic device of the map data;
   determining, by the processor, a probability distribution of a traffic signal associated with the matched traffic devices based on a Hidden Markov model (HMM), wherein the HMM includes a diffusion model that updates a signal state matrix with probability values based on a last detected traffic signal, a time since the last detected traffic signal, and a state transition model associated with a type of traffic device; and
   planning, by the processor, control of the vehicle based on the probability distribution.

2. The method of claim 1, further comprising determining a probability distribution of another traffic signal associated with the matched traffic devices based on an inference model.

3. The method of claim 1, wherein the Hidden Markov model includes a measurement model.

4. The method of claim 3, wherein the measurement model applies measured values to the signal state matrix based on a detected signal state of the traffic signal.

5. The method of claim 1, further comprising determining intersection information associated with the matched traffic devices based on the map data, and wherein the probability distribution is based on the intersection information.

6. The method of claim 1, wherein the intersection information includes at least one of lane segments and lane to lane connections associated with the matched traffic devices.

7. The method of claim 1, further comprising:
   determining whether the traffic signal is detected from the sensor data,
   wherein when the traffic signal is detected, the determining the probability distribution is based on a measurement model, and
   wherein when the traffic signal is not detected, the determining the probability distribution is based on a diffusion model.

8. A system for interpreting traffic information by a vehicle, comprising:
   a map datastore that stores map data associated with an environment of the vehicle, where the map data includes traffic devices;
   a sensing device that generates sensor data, where the sensor data depicts a traffic device in the environment of the vehicle;
   a control module stored in memory and configured to, by a processor, match the traffic device of the sensor data with a traffic device of the map data, determine a probability distribution of a traffic signal associated with the matched traffic devices based on a Hidden Markov model (HMM), and plan control of the vehicle based on the probability distribution wherein the HMM includes a diffusion model that updates a signal state matrix with probability values based on a last detected traffic signal, a time since the last detected traffic signal, and a state transition model associated with a type of traffic device.

9. The system of claim 8, wherein the control module is further configured to determine a probability distribution of another traffic signal associated with the matched traffic devices based on an inference model.

10. The system of claim 8, wherein the Hidden Markov model includes a measurement model.

11. The system of claim 10, wherein the measurement model applies measured values to the signal state matrix based on a detected signal state of the traffic signal.

12. The system of claim 8, wherein the control module is further configured to determine intersection information associated with the matched traffic devices based on the map data, and wherein the probability distribution is based on the intersection information.

13. The system of claim 8, wherein the intersection information includes at least one of lane segments and lane to lane connections associated with the matched traffic devices.

14. The system of claim 8, wherein the control module is further configured to determine whether the traffic signal is detected from the sensor data, wherein when the traffic signal is detected, the control module determines the probability distribution based on a measurement model, and wherein when the traffic signal is not detected, the control module determines the probability distribution based on the diffusion model.

* * * * *